Figure 1:
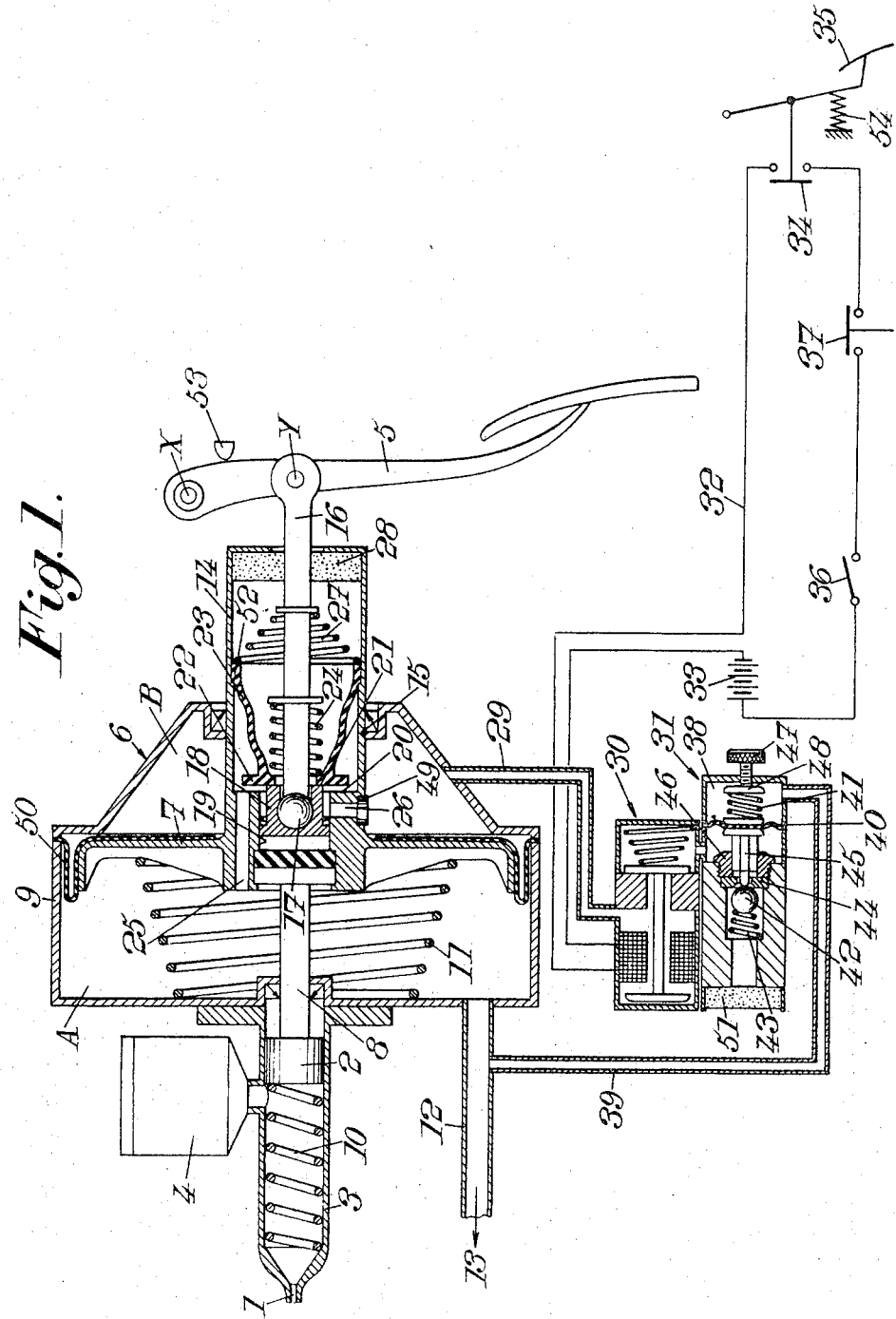

United States Patent
Bessiere

[11] 3,871,497
[45] Mar. 18, 1975

[54] VEHICLE BRAKE INSTALLATIONS
[75] Inventor: Pierre Etienne Bessiere, Golf-St-Nom-La-Breteche, France
[73] Assignee: Labavia - S.G.E., Paris, France
[22] Filed: Mar. 5, 1973
[21] Appl. No.: 337,822

[30] Foreign Application Priority Data
Mar. 10, 1972 France .............................. 72.08452

[52] U.S. Cl. ...................... 192/3 TR, 91/6, 91/359, 60/545, 60/552
[51] Int. Cl. ............................................. B60k 29/02
[58] Field of Search .......... 91/459, 1, 6, 31; 60/545, 60/552; 192/3 TR, 3 H, 3 R; 180/106 R, 106 P; 180/77 R

[56] References Cited
UNITED STATES PATENTS

| | | | |
|---|---|---|---|
| 2,643,518 | 6/1953 | Righter ............................. | 192/3 TR |
| 2,703,637 | 3/1955 | Dodge ............................... | 192/3 H |
| 2,777,456 | 1/1957 | Ey ..................................... | 137/505.4 Z |
| 2,881,879 | 4/1959 | Perrino ............................. | 192/3 TR |
| 3,126,987 | 3/1964 | Stell et al .......................... | 192/3 TR |
| 3,362,298 | 1/1968 | Julow ................................. | 91/1 |
| 3,364,818 | 1/1968 | Hager et al. ....................... | 91/459 |
| 3,371,484 | 3/1968 | Jalow ................................. | 60/545 |
| 3,460,439 | 8/1969 | Cripe ................................. | 91/459 |

Primary Examiner—Paul E. Maslousky
Attorney, Agent, or Firm—Stevens, Davis, Miller & Mosher

[57] ABSTRACT

The installation is for an internal combustion engine vehicle and comprises brakes actuated by the sliding of a piston in a master cylinder, controllable by thrust on a brake pedal through a vacuum "servobrake" type mechanism. A fixed casing is divided into two compartments A and B by a piston connected to the cylinder. The suction which exists at a suitable point of the engine is applied in compartment A. The same suction is applied in compartment B as long as this pedal is released and reduced automatically when the pedal is relatively depressed, by communication of said compartment B with the atmosphere. A pipe connects compartment B to the atmosphere and a valve is mounted on this pipe, whose degree of opening is servocoupled to the release of the accelerator pedal.

12 Claims, 2 Drawing Figures

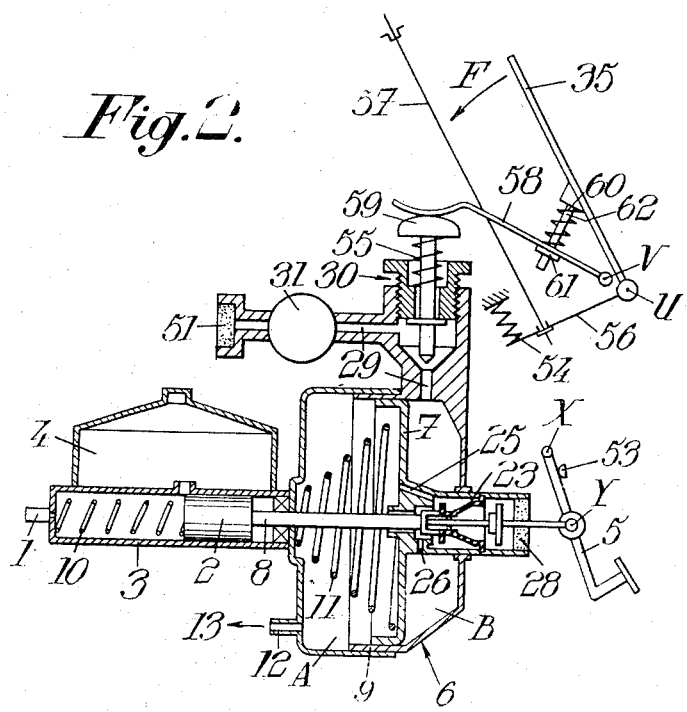

VEHICLE BRAKE INSTALLATIONS

The invention relates to brake installations for vehicles with an internal combustion engine, comprising brakes, preferably friction brakes, actuated preferably hydraulically, by the movements of a member such as the sliding of a piston in a master cylinder, which movements themselves are controllable by thrust on a brake pedal connected to said member by an assistance mechanism of the vacuum "servobrake" type.

It relates more particularly, among these installations, to those in which the assistance mechanism comprises:
a fixed casing divided into two compartments A and B by a piston — which will be called below assistance piston — connected to the above-mentioned member,
means for applying in the compartment A, of this casing, furthest spaced from the brake pedal, the suction which exists at a suitable point of the engine of the vehicle,
and means servocoupled to the movement of the brake pedal to apply the same suction in compartment B as long as this pedal is released and on the contrary to reduce this suction automatically when the pedal is relatively depressed, by communincation of said compartment with the atmosphere.

It is a particular object of the invention to render the said installations such that their brakes can be very simply actuated by a control other than a thrust on the brake pedal: this other control can be for example a telecommand transmitted by radio or optically, or again by manual actuation of a knob provided in the cab of the vehicle, for eexample on its dashboard; and in preferred embodiments, the other control concerned is the simple release of the accelerator pedal.

Said other control is advantageous in that it ensures the triggering of braking more rapidly and/or more automatically than with the brake pedal control alone, which often lessens the task of the driver and, may often help to avoid accidents, especially by telescoping.

Braking installations of the type concerned are essentially characterised in that they comprise in addition a pipe connecting compartment B to the atmosphere and a valve mounted on this pipe, of which valve the degree of opening is servocoupled to a control other than a thrust on the brake pedal.

In preferred embodiments, recourse is had also to one or more of the following features:
the installation compries in addition throttle means for the pipe which are adjustable independently of said other control,
the throttle means are constituted by a pressure reducer,
the pressure reduce is connected to the source of suction or to compartment A so that the variations of this suction alone do not influence the value of the difference in pressure applied on the piston of the casing,
the pressure reducer is biased in adjustable manner by means of an outer control member working for example by screwing,
the pressure reduce is biased in automatically adjustable manner as a function of one of the parameters which vary in the course of braking (time, speed of the vehicle . . .),
the assistance mechanism comprises a valve mounted on the passage connecting compartment B to compartment A or to the atmosphere according to the relative degree of depression of said brake pedal, which valve is adapted to be traversed by relatively high air-flow in the direction of compartment B and on the contrary by relatively low air-flow coming from this compartment.

The invention comprises, apart from these main features, certain other features which are preferably used at the same time and which will be more explicitly considered below.

In the following there will be described with reference to the accompanying drawings, two preferred embodiments of a vehicle brake installation constructed according to the invention.

FIGS. 1 and 2 of these drawings show diagrammatically these two installations.

In manner known in itself, each of these installations, relating to a vehicle equipped with an internal combustion engine, comprises a hydraulic brake circuit 1 adapted to transit to friction brakes generally mounted on the four wheels of the vehcle the sliding of a piston 2 in a master cylinder 3 supplied with oil from a reservoir 4.

These slidings are actuated by thrust of a foot of the driver of the vehicle on a brake pedal 5 servocontrol mounted in pivoting manner around a fixed axle X and connected to said piston by an assistance device or a vacuum ervocontrol 6.

This device comprises a piston 7 connected by a rod 8 to the piston 2 and adapted to be moved in a fixed casing 9 which it divides into two compartments A and B, A denoting the compartment furthest spaced from the pedal 5, that is to say the compartment on the left in the Figures and B the other compartment.

The fluid-tightness between the edge of this piston and casing is ensured by a flexible diaphragm 50 (FIG. 1) or by a suitable sliding seal (FIG. 2), in which case the portion of the casing 9 receiving the piston 7 is cylindrical.

Helicoidal compression springs 10 and 11 permanently urge pistons 2 and 7 towards the pedal 5, that is to say towards the right in the figures.

The compartment A is connected permanently, through a pipe 12, to a source of suction 13 which is constituted by one of the zones of the vehicle engine, where the flow of the combustion fluids creates a vacuum: this is preferably the zone situated in the intake pipe downstream of the butterfly gas valve.

At rest, that is to say when the servo-brake is not actuated, the compartment B is isolated from the atmosphere and communication is established between the two compartments A and B through the piston 7: the pressure existing on each side of this piston is hence the same and the latter is thrust back by the springs towards its non-braking position, the extreme right position shown in the figures.

On the operation of the servo-brake, triggered by the depression of the pedal 5, the communication between the two compartments A and B is on the contrary eliminated and the compartment B is connected to the atmosphere: the difference between the pressures than applied on the two faces of the piston 7 is manifested by a movement of the latter in the direction of braking (towards the left), which effect assists that due to the depression of the brake pedal, up to an equilibrium position dependent on the degree of this depression.

These various automatic connections are advantageously ensured in the following manner known in itself.

The piston 7 is fast at its centre with a hollow hub 14 with a cylindrical outer wall mounted so as to be slidable in sealed manner in an opening 15 formed in the casing 9, on the side of the pedal 5.

A rigid link-rod 16 has one of its ends mounted in pivoting manner on the pedal 5 around an axle X and its other end mounted also in pivoting manner, by a ball and socket linkage 17, inside a small piston 18 adapted to slide in a cylindircal bore 19 inside the hub 14, which bore is bounded on the side of the pedal 5 by an annular shoulder 20 also inside the hub.

The piston 18 has itself an enlarged cylindrical head connected on the side of the pedal 5 to a narrower skirt ending in an annular collar 21.

A valve 22 in the shape of a washer borne inside the hub by an elastically flexible cup 23 is constantly urged by a spring 24 towards the left, that is to say against one and/or other of thee two seats 20 and 21.

The wall of the bore 19 is pieced by two passages, the first passage 25 connecting the compartment A to a point of the shoulder 20, and the second passage 26 connecting the compartment B to a point of the cylindrical bore 19, arranged radially opposite the skirt of the small piston 18.

A spring 27 supported on one hand on a ledge of the hub 14 through a terminal beading 52 of the cup 23 and on the other hand on the connecting rod, constantly urges said connecting rod to the right, with a force greater than that of the spring 24.

Lastly an air filter 28 traversed without play by the rod 16 is mounted at the outlet of the hub facing the pedal 5.

It is seen that, when all the movable elements of the mechanism occur in their extreme right position in the Figure as shown, for which position the assembly pedal 5 — rod 16 bears against a fixed stop shown diagrammatically at 53, the seat 21 is applied against the valve 22, which cuts any communication with the outside whilst communication between the compartments A and B is established through the passages 25 and 26.

On the contrary, when the pedal 5 is depressed, the valve 22 comes first into contact with the seat 20, which cuts communication between the two compartments A and B, then the seat 21 separates from the valve 22, which establishes communication between the compartment B and the atmosphere through the passage 26, the cup 23, the part on the right of the hub 14 and the filter 28.

As a result there is a movement of the assembly piston 7 — hub 14 as well as of the piston 2 and the assembly 22 — seat 20 towards the left until equilibrium defined by new application of the valve 22 on the seat 21, which corresponds to another separation between this valve and the seat 20.

The assistance is hence automatically proportioned to the depression of the pedal 5.

There will now be described means provided according to the invention to control automatically a movement of the piston 7 towards the left, that is to say ensuring gripping of the friction brakes, when the accelerator pedal is released.

These means comprise, in the case of the two Figures, a pipe 29 connecting the compartment B to the atmosphere through a filter 51 and, interposed in this pipe 29:

a valve 30 whose degree of opening is a function of the position of the accelerator pedal 35, and a member 31 enabling the pipe 29 to be throttled in a manner adjustable independently of said accelerator pedal.

In the installation of FIG. 1, the valve 30 is an electrovalve operating as a stop and go valve in the sense that it is fully open when it is enregised and on the other hand closed in the contrary case.

This electro-valve is supplied by an electric circuit 32 comprising a source of electric current 33 (which is preferably the battery of the vehicle) and a switch 34 connected to the accelerator pedal 35 and mounted so as to be closed when this pedal is released.

There is also provided preferably in the circuit 32 a general switch 36, which is for example actuated by the ignition key of the vehicle, and a switch 37 connected to the clutch pedal (not shown) and mounted so as to be open when this pedal is depressed.

The throttle member 31 is here a pressure reducer.

If the source of suction was such that this suction is constant, it could be sufficient to connect the compartment B to the atmosphere through a normal reducer.

However, in the case envisaged here, the suction of this source is variable: it depends in particular on the rotary speed of the engine and hence, for a given speed of the vehicle, on the ratio selected for its gear change.

These variations in suction of the source are automatically compensated, according to the invention, by giving to the pressure reduction imposed through the apparatus 31, a value all the higher as said suction is itself higher or as the pressure existing in compartment A is less.

To this end, said suction itself is made to act on the position of the control member of the reducer.

In the embodiment illustrated, this reduce comprises an enclosure 38 connected to the source of suction 13 or to compartment A through a passage 39, of which enclosure one of the faces bounded by a flexible and fluid-tight diaphragm 40 urged outwardly of the enclosure by a helicoidal compression spring 41 inside this enclosure.

The reducer comprises also a ball-valve of which the ball 42 is urged by a spring 43 against a seat 44 mounted in series with the pipe 29 for connection to the atmosphere.

A ribbed finger 45 whose movements are guided by a ring 46 is inserted between the ball 42 and the diaphragm 40.

Lastly an adjusting screw 47 whose head is accessible from the outside enables the force of the spring 41 to be adjusted by movement of the axial position of a cup 48 against which the end of this spring opposite the diaphragm 40 is supported.

It will be easily understood that adjustment of the screw 47 enables the separation between the ball 42 and its seat 44 to be adjusted and hence the cross-section of the throttled passage through which atmospheric air is expanded and admitted into the pipe 29.

It will also be understood that, the lower the pressure existing in the enclosure 38, the more the diaphragm 40 is sucked to the right in the FIG. 1 and the less is the abovesaid cross-section of the throttled passage: said cross-section is hence all the smaller, and the expansion that it imposes, all the higher as the suction applied to the installation is greater and the desired compensation is thus indeed obtained.

To avoid the atmospheric air admitted into the compartment B being directly evacuated towards the source of suction through the passages 26 and 25, there is mounted on the passage 26 a valve 49 capable of being traversed by an air-flow relatively large in the direction of compartment B and on the other hand very slight coming from this compartment.

Through this fact communication between said compartment B and the atmosphere on actuation of the pedal 5 is established almost instantaneously through this valve.

In the same way the throttled connection between this compartment B and the atmosphere on release of the accelerator pedal 35, not traversing said valve 49, is also established almost instantaneously.

On the other hand the consecutive evacuations of air contained in the compartment B through the valve 49, on the release of the grip of the friction brakes, are much slower, which is not a drawback since if braking must be established rapidly with a relatively large stroke of the piston 2 towards the left, of which stroke only the end is truly efficacious, its elimination can be relatively slow, and this all the more so as it requires a return stroke of said piston towards the right representing only a small portion of the preceding stroke.

It may be noted that a small portion of the air admitted into the compartment B through the reducer 31 is also evacuated permanently through the valve 49, but it relates there to a very slight even, negligible flow without direct influence on the regulation brought into play.

The valve 49 could be mounted on the passage 26 in easily removable manner so as to be replacable by another, of different leak cross-section, with a view for example to modifying the speed of return of the pistons into their resting positions.

Since the pressure existing in compartment B is applied to the left wall of the diaphragm 40, the progressive increase in this pressure due to the admission of atmospheric air is manifested little by little by the movement of said diaphragm towards the right and finally of the closing of the ball-valve when this pressure reaches a sufficient value.

Consequently, on the release of the accelerator pedal 35, which release is manifested by the movement of this pedal towards its maximum protruded position under the effect of its return spring 54, there is observed a slowing-down whose predetermined intensity depends on the position of this screw 47.

This slowing-down ceases when the accelerator pedal is again depressed.

It is to be noted that any moment the driver of the vehicle can apply the frction brakes, if necessary to the maximum, by thrusting on the pedal 5 beyond the position in which the latter has been driven by the automatic means.

The adjustment of the intensity of the automatic braking generated by simple release of the accelerator pedal can be ensured very simply by adjusting the screw 47.

The simplicity of this adjustment constitutes a major advantage of the invention.

Said adjustment can be left to the desire of the driver or on the contrary reserved for specialists at the service station or even at the factory.

This adjustment could also be servo-coupled to the variations of a suitable parameter such as time, speed or deceleration of the vehicle, if necessary as a function of a predetermined program.

The role of the switch 37 above is to prevent, in a vehicle where the actuation of the gear-change requires in practice the release of the accelerator pedal at the same time and the depression of a clutch pedal, said release from being manifested by an undesirable braking.

In the installation of FIG. 2, the valve 30 is a valve urged constantly towards its open position by a spring 55.

The accelerator pedal 35 is mounted pivotally around an axle U and it is fast to a lever arm 56, which, on one hand, actuates, through a Bowden cable 57, the member which regulates the amount of fuel supplied to the engine, and on the otherhand, is subject to the effect of a return spring 54. There is provided also a lever 58 mounted pivotally about an axle V and whose free end is supported on the head 59 of the valve 30.

A compression spring 60 is inserted between the pedal 35 and the lever 58 whilst below this lever is arranged a stop 61 which is connected by a rod 62, to the pedal 35, this rod passing freely through the lever 58.

The pedal 35 is shown in its extended resting position, that is to say when it is released by the driver. When the drive thrusts on the pedal so as to make it pivot in the direction of the arrow F, it immediately draws, through its spring 60, the lever 58 in the same direction, which causes the closing of the valve 30. When the driver releases the pedal, it draws the lever 58 by means of the stop 61, which causes opening of the valve 30 and the triggering of braking by the admission of atmospheric air into the compartment B.

The flow of this air, admitted through the filter 51 and the pipe 29 traverses successively the throttle member 31, the open valve 30, the compartment B, the passages 26 and 25 (which communicate between themselves since the brake pedal 5 is released) and the compartment A to be finally aspirated by the source of suction 13 through the passage 12.

This current of air hence flows constantly during braking.

Its flow-rate, and hence the intensity of the braking obtained, is adjusted by acting on the throttle member 31, manually or automatically, for example as a function of one of the parameters mentioned above with regard to adjustment of the screw 47.

The installation of FIG. 2 which has just been described is adapted in particular to vehicles equipped with an automatic gear-box, wihtout a clutch pedal; for vehicles with a conventional gear-box, it would be convenient to provide special means to neutralise automatically the influence of the release of the pedal 35 on the vavle 30 on depression of the clutch pedal.

The above-described installations which lend themselves to many types osf brake control have numerous advantages over those existing hitherto, for example as regards ease of adaptation to current vehicles equipped with servo-brakes, simplicity of regulation, compactness and, in the embodiment of FIG. 1, independence relative to variations of the suction.

As is self-evident and as emerges already from the foregoing, the invention is in no way limited to those of its types of application and embodiments which have been more explicitly envisaged; it encompasses, on the contrary, all modifications.

I claim:

1. Brake installation for a vehicle with an internal combustion engine, comprising brakes actuated by the movements of a piston member in a master cylinder, which movements themselves are controllable by thrust on a brake pedal connected to said piston member by an assistance mechanism of the vacuum "servobrake" type, said mechanism comprising: a fixed casing divided into two compartments A and B by piston means connected to said piston member, pipe means for applying in said compartment A, furthest spaced from the brake pedal, the suction which exists at a suitable point of said engine, first valve means controlled by the brake pedal, first passage means connecting compartment A to said first valve means, second passage means connecting said first valve means to compartment B, third passage means connecting said first valve means to the atmosphere, said first valve means transmitting the same suction in compartment A to compartment B as long as said pedal is released and reducing this sucction automatically when the pedal is relatively depressed, by connecting said compartment B with the atmosphere through said third passage means, said installation including: duct means leading from compartment B to the atmosphere, second valve means comprising a simple stop valve inserted in said duct means and control means other than said brake pedal arranged to regulate the action of said stop valve and including assistance mechanism comprising a further valve mounted on said second passage means, which further valve is adapted to be tranversed by a relatively high air-flow towards compartment B and by a relatively low air-flow towards compartment A.

2. Brake installation according to claim 1, wherein said other control means is the release of the accelerator pedal.

3. Brake installation according to claim 1, comprising in addition throttle means for throttling the duct means adjustable independently of said other control means.

4. Brake installation according to claim 3, wherein the throttle means are constituted by a pressure reducer.

5. Brake installation according to claim 4, wherein the pressure reducer is connected to one of the suction source and compartment A and wherein the reducer comprises: an enclosure connected to the source of suction and limited in part by a diaphragm urged towards the outside of this enclosure by an inner compression spring; a valve, mounted on the duct means connecting the compartment B to the atmosphere; and a finger inserted between said diaphragm and said valve so as to space the latter all the more from its seat as the pressure existing in the enclosure is higher.

6. Brake installation according to claim 5, wherein said stop valve is a ball valve.

7. Brake installation according to claim 5, wherein the force of the compression spring inside the enclosure is adjustable by means of an outer control member.

8. Brake installation according to claim 7, wherein the adjustment means works by screwing.

9. Brake installation according to claim 4, comprising means for servocoupling the adjustment of the reducer to the variations of a suitable parameter.

10. Brake installation according to claim 1, wherein the said second valve means mounted in the duct means is an electro-valve arranged so as to be open when it is energized.

11. Brake installation according to claim 10, wherein the energising circuit of the electro-valve comprises a switch connected to the accelerator pedal and mounted so as to be closed when this pedal is released.

12. Brake installation according to claim 1, wherein the compartments A and B communicate between themselves freely and permanently as long as the brake pedal is not depressed.

* * * * *